US008867502B2

(12) United States Patent
Bharadwaj et al.

(10) Patent No.: US 8,867,502 B2
(45) Date of Patent: Oct. 21, 2014

(54) METHOD AND APPARATUS FOR APPLICATION OF PRECODER INFORMATION AT THE UE IN CLOSED LOOP TRANSMIT DIVERSITY

(75) Inventors: Arjun Bharadwaj, San Diego, CA (US); Sharad Deepak Sambhwani, San Diego, CA (US); Siddharth Mohan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 91 days.

(21) Appl. No.: 13/534,180

(22) Filed: Jun. 27, 2012

(65) Prior Publication Data

US 2013/0176992 A1    Jul. 11, 2013

Related U.S. Application Data

(60) Provisional application No. 61/523,766, filed on Aug. 15, 2011.

(51) Int. Cl.
*H04W 72/04* (2009.01)
*H04B 7/04* (2006.01)
*H04B 7/06* (2006.01)

(52) U.S. Cl.
CPC ......... *H04W 72/0446* (2013.01); *H04B 7/0456* (2013.01); *H04B 7/0639* (2013.01); *H04B 7/0404* (2013.01)
USPC ............ 370/336; 370/337; 370/458; 375/296

(58) Field of Classification Search
USPC ............ 370/335, 336; 455/442; 375/260–267
See application file for complete search history.

(56) References Cited

U.S. PATENT DOCUMENTS

| | | | | |
|---|---|---|---|---|
| 8,102,851 | B1* | 1/2012 | Mandin et al. ................. | 370/390 |
| 8,306,050 | B2* | 11/2012 | Ho ................. | 370/447 |
| 8,520,659 | B2* | 8/2013 | Humblet ................. | 370/350 |
| 2002/0021692 | A1* | 2/2002 | Huh et al. ................. | 370/352 |
| 2006/0256757 | A1* | 11/2006 | Kuusela et al. ................. | 370/335 |
| 2008/0043867 | A1* | 2/2008 | Blanz et al. ................. | 375/260 |
| 2010/0008445 | A1* | 1/2010 | Khan ................. | 375/296 |
| 2010/0322331 | A1 | 12/2010 | Sun et al. | |
| 2011/0080972 | A1* | 4/2011 | Xi et al. ................. | 375/267 |
| 2011/0249656 | A1 | 10/2011 | Cai et al. | |
| 2012/0008609 | A1 | 1/2012 | Ma et al. | |
| 2012/0093120 | A1* | 4/2012 | Ko et al. ................. | 370/329 |

OTHER PUBLICATIONS

Huawei et al: "Initial system performance of CLTD", 3GPP Draft; R1-110313 Initial System Performance of CLTD, 3rd Generation Partnership Project (3GPP), Mobile Competence Centre; 650, Route Des Lucioles : F-06921 Sophia-Antipolis Cedex ; France, vol. RAN WG1, no. Dublin, Ireland; 20110117-20110121, Jan. 31, 2011, XP050599040, [retrieved on Jan. 31, 2011].

(Continued)

*Primary Examiner* — Edan Orgad
*Assistant Examiner* — Emmanuel Maglo
(74) *Attorney, Agent, or Firm* — Darren M. Simon

(57) ABSTRACT

Apparatus and methods are described herein for applying precoding information updates at a user equipment (UE). The UE receives precoder information from a network component. The UE can them transmit packet data over a transmit time interval (TTI) of tow or more slots using transmit diversity. The UE updates the precoder for transmit diversity with the precoder information in a slot subsequent to the first slot in the TTI. The precoder information is applied to update the precoder at a slot boundary within the TTI.

24 Claims, 9 Drawing Sheets

(56) References Cited

OTHER PUBLICATIONS

International Search Report and Written Opinion—PCT/US2012/050825—ISA/EPO—Nov. 8, 2012.

Qualcomm Incorporated: "Sensitivity to PCI Feedback Delay for UL CLTD", 3GPP Draft; R1-112674_Sensitivity to PCI Feedback Delay for UL CLTD, 3rd Generation Partnership Project (3GPP), Mobile Competence Centre ; 650, Route Des Lucioles ; F-06921 Sophia-Antipolis Cedex ; France, vol. RAN WG1, no. Athens, Greece; 20110822, Aug. 26, 2011, XP050537881, [retrieved on Aug. 26, 2011].

Qualcomm Incorporated: "Impact of PCI Update Rate on CLTD Performance in CPC", 3GPP Draft; R1-112673_Impact_of_PCI_Update_Rat_on_CLTD_PERF_CPC, 3rd Generation Partnership Project (3GPP), Mobile Competence Centre ; 650, Route Des Lucioles ; F-06921 Sophia-Antipolis Cedex ; France, vol. RAN WG1, no. Athens, Greece; 20110822, Aug. 19, 2011, XP050537851; [retrieved on Aug. 19, 2011].

Qualcomm Incorporated: "Simulation Framework for Link Evaluation of UL MIMO", 3GPP Draft; R1-110682 Simulation_Frameork_Link Evaluation_UL_MIMO, 3rd Generation Partnership Project (3GPP), Mobile Competence Centre ; 650, Route Des Lucioles ; F-06921 Sophia-Antipolis Cedex ; France, vol. RAN WG1, no. Taipei, Taiwan; 20110221-20110225, Feb. 18, 2011, XP050599189, [retrieved on Feb. 18, 2011].

\* cited by examiner

METHOD AND APPARATUS FOR APPLICATION OF PRECODER INFORMATION AT THE UE IN CLOSED LOOP TRANSMIT DIVERSITY

CLAIM OF PRIORITY UNDER 35 U.S.C. §119

The present Application for Patent claims priority to Provisional Application No. 61/523,766, entitled "APPLICATION OF PRECODER INFORMATION AT THE UE IN CLOSED LOOP TRANSMIT DIVERSITY" filed Aug. 15, 2011, assigned to the assignee hereof and hereby expressly incorporated by reference herein.

BACKGROUND

1. Field

Aspects of the present disclosure relate generally to wireless communication systems, and more particularly, for performing closed loop transmit diversity.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with some aspects, a method for wireless communication is described. The method includes receiving precoder information and transmitting packet data over a transmit time interval (TTI) of two or more slots from two or more antennas. The method also includes updating a precoder with precoder information in a slot subsequent to a first slot in the TTI. The precoder information is applied at a slot boundary within the TTI.

Other aspects include one or more of: a computer program product having a computer-readable medium including at least one instruction operable to cause a computer to perform the above-described method; an apparatus including one or more means for performing the above-described method; and an apparatus having a memory in communication with a processor that is configured to perform the above-described method.

These and other aspects of the invention will become more fully understood upon a review of the detailed description, which follows.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

An apparatus and method addresses application of Precoder Information (PCI) at the User Equipment (UE). If the PCI information is applied by the User Equipment (UE) at a Transmit Time Interval (TTI) boundary and the PCI update rate is three slots, then the precoder applied by the UE remains constant for the duration of the TTI. Therefore, if there is a PCI feedback error, the applied erroneous precoder compromises the data transmission in that TTI. The present innovation mitigates this problem by applying the precoder in the second or subsequent slot of a TTI. This allows for the correct precoder to be applied at least in a portion of the TTI. The probability of the erroneous precoding information being applied over the duration of a TTI is reduced.

Figure 1:
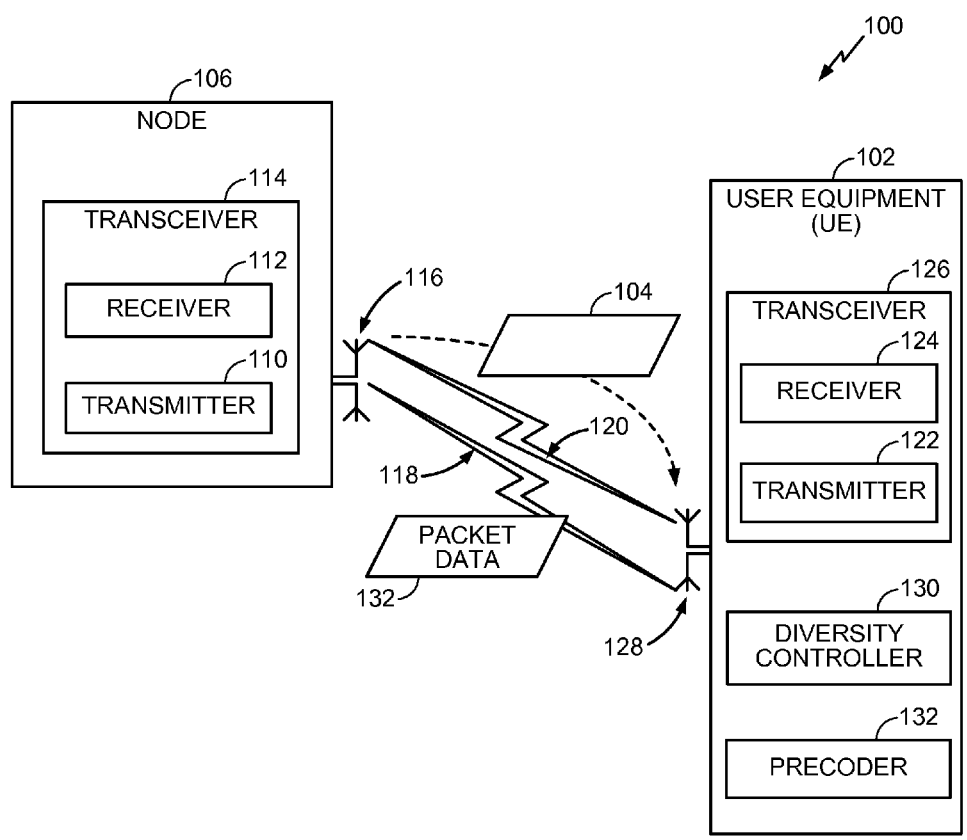
FIG. 1 is a block diagram illustrating a communication system, in accordance with various disclosed aspects.

With reference to FIG. 1, in a cellular communication system 100, user apparatus, depicted as user equipment (UE) 102, receives feedback 104 from a base node, or merely node 106, which is currently serving the UE 102. The node 106 has a transmitter 110 and receiver 112 of a transceiver 114 for communicating via one or more antennas 116 with the UE 102 respectively on a downlink 118 and an uplink 120. The UE 102 has a transmitter 122 and receiver 124 of a transceiver 126 for communicating via more than one antenna 128 with the node 106 respectively on the uplink 120 and the downlink 118. In particular, a diversity controller 130 uses the feedback data 104 (e.g., Precoder Information (PCI)) to update a precoder 132 with delays appropriate for each respective antenna to achieve transmit diversity. In some aspects, transmit diversity may be achieved via beamforming for closed loop transmit diversity (CLTD). In other aspects, transmit diversity may be achieved using uplink (UL) multiple-input-multiple-output (MIMO). Other transmit diversity techniques are equally applicable.

Figure 2:
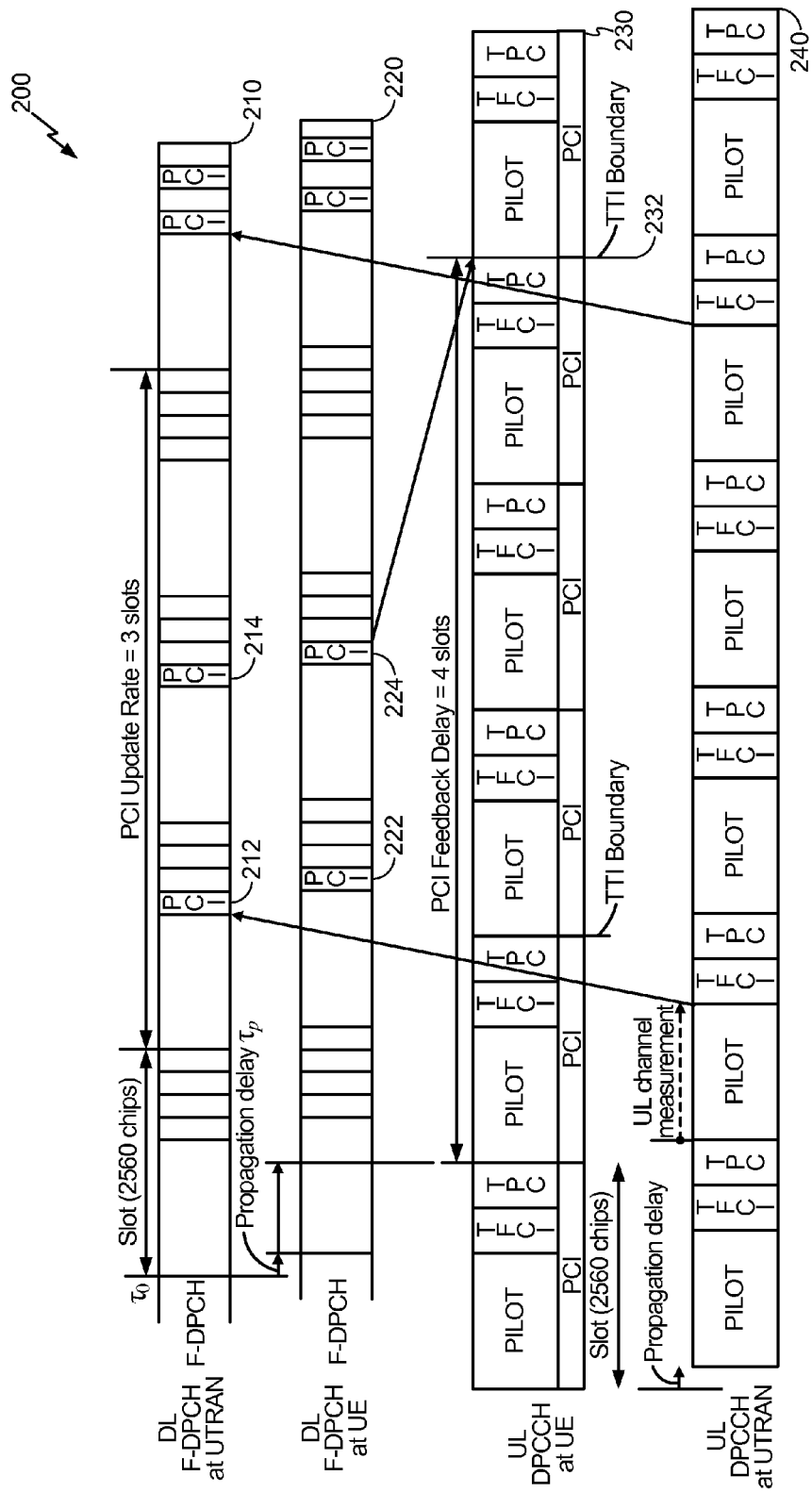
FIG. 2 is a timing diagram depicting precoder updating, in accordance with various disclosed aspects.

FIG. 2 is a timing diagram depicting the application of PCI feedback information. In this example, the PCI feedback update rate is three slots, and the PCI bits are transmitted on the fractional dedicated physical channel (F-DPCH). While the F-DPCH is shown in this example, any other F-DPCH-like channel, such as the fractional transmitted precoding indicator channel (F-TPCH) may also be used for transmitting the PCI bits. The UE updates the precoder only at the TTI boundary. As shown at 210, DL signals are transmitted from a network component, such as a UTRAN, via the DL F-DPCH. As shown at 220, DL signals are received at the UE via the DL F-DPCH. As shown at 230, UL signals are transmitted from the UE via the UL DPCCH, and as shown at 240, DL signals are received at the UTRAN via the UL DPCCH.

Each slot comprises 2560 chips. As shown at 212, a first PCI bit is transmitted in a first slot, and as shown at 214, a second PCI bit is transmitted in a second slot. Due to propagation delay $\tau_p$, the transmitted signal is received at the UE with a timing offset. The first PCI bit is received at the UE, as shown at 222, and the second PCI bit is received at the UE, as shown at 224. Upon receipt of the two PCI bits, the UE can update the precoder. As shown at 232, the UE may apply the PCI feedback information at the TTI boundary. Because the PCI update is applied at the TTI boundary, the precoder applied by the UE remains constant for the duration of the TTI. As such, if a PCI feedback error occurs, the data transmission transmitted during that TTI may be compromised.

Figure 3:
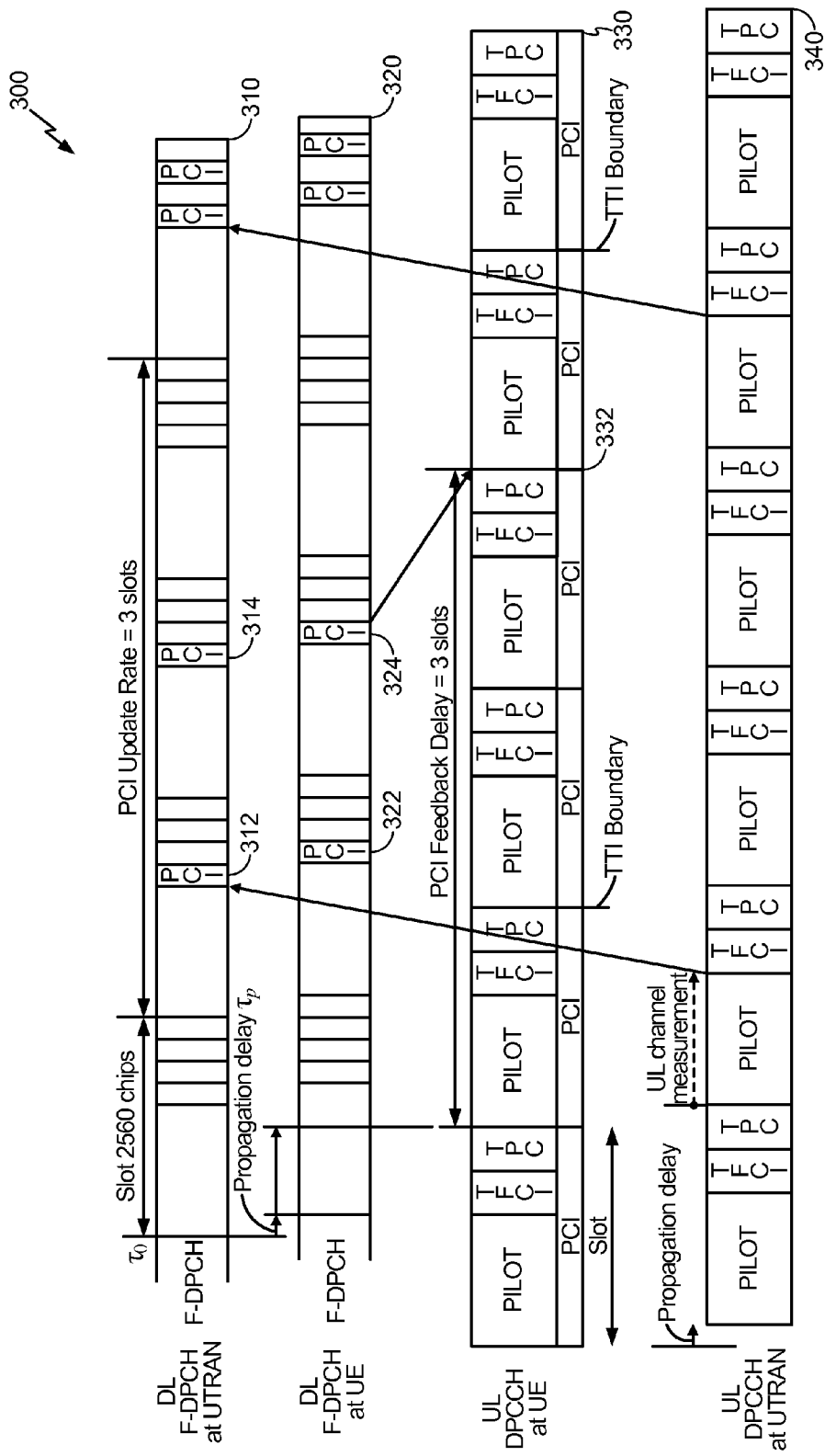
FIG. 3 is another timing diagram depicted precoder updating, in accordance with various disclose aspects.

FIG. 3 depicts an example timing diagram wherein PCI updates are performed at slot boundaries, and not restricted to the TTI boundary. Similar to FIG. 2, the PCI feedback update rate is three slots, and the PCI bits are transmitted on the F-DPCH (or other similar channel such as the F-TPICH). As shown at 310, DL signals are transmitted from a network component, such as a UTRAN, via the DL F-DPCH. As shown at 320, DL signals are received at the UE via the DL F-DPCH. As shown at 330, UL signals are transmitted from the UE via the UL DPCCH, and as shown at 340, DL signals are received at the UTRAN via the UL DPCCH.

As shown at 312, a first PCI bit is transmitted in a first slot, and as shown at 314, a second PCI bit is transmitted in a second slot. Due to propagation delay $\tau_p$, the transmitted signal is received at the UE with a timing offset. The first PCI bit is received at the UE, as shown at 322, and the second PCI bit is received at the UE, as shown at 324. Upon receipt of the two PCI bits, the UE can update the precoder. As shown at 332, the UE may apply the PCI feedback information at the next available slot boundary upon receipt of the second PCI bit. This allows the correct precoder to be applied during at least a portion of the TTI, even if a PCI feedback error occurs.

Figure 4:
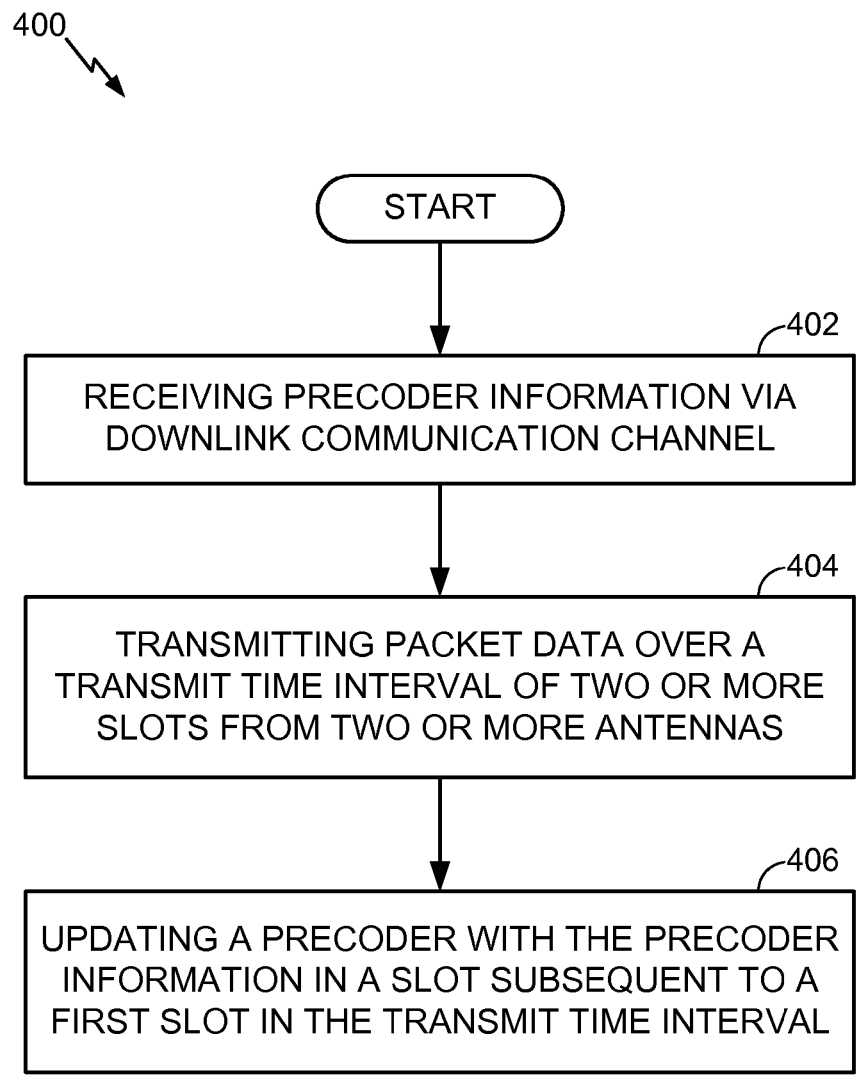
FIG. 4 is a flowchart depicting a precoder updating method, in accordance with various disclosed aspects.

FIG. 4 depicts a method 400 for applying precoder update information, in accordance with some aspects. As shown at 402, precoder information may be received via a downlink transmission channel. For example, the precoder information may be received from a network component, such as a UTRAN, providing information that can be used for uplink data transmission by a UE. In some aspects, the precoder information may be received by the UE on the F-DCPH, F-TPICH, and/or another similar channel The UE may transmit packet data over a transmit time interval (TTI), as shown at 404. The TTI may be, for example, two or more slots. In some aspects, the packet data may be transmitted using closed loop transmit diversity (CLTD), and may be transmitted from two or more antennas. In other aspects, the UE may transmit packet data via UL MIMO. As shown at 406, a precoder may be updated with the received precoder information in a slot subsequent to a first slot in the TTI. The precoder information may be applied at a slot boundary within the TTI, and not at the TTI boundary, in order to increase accuracy of the transmitted data.

Figure 5:
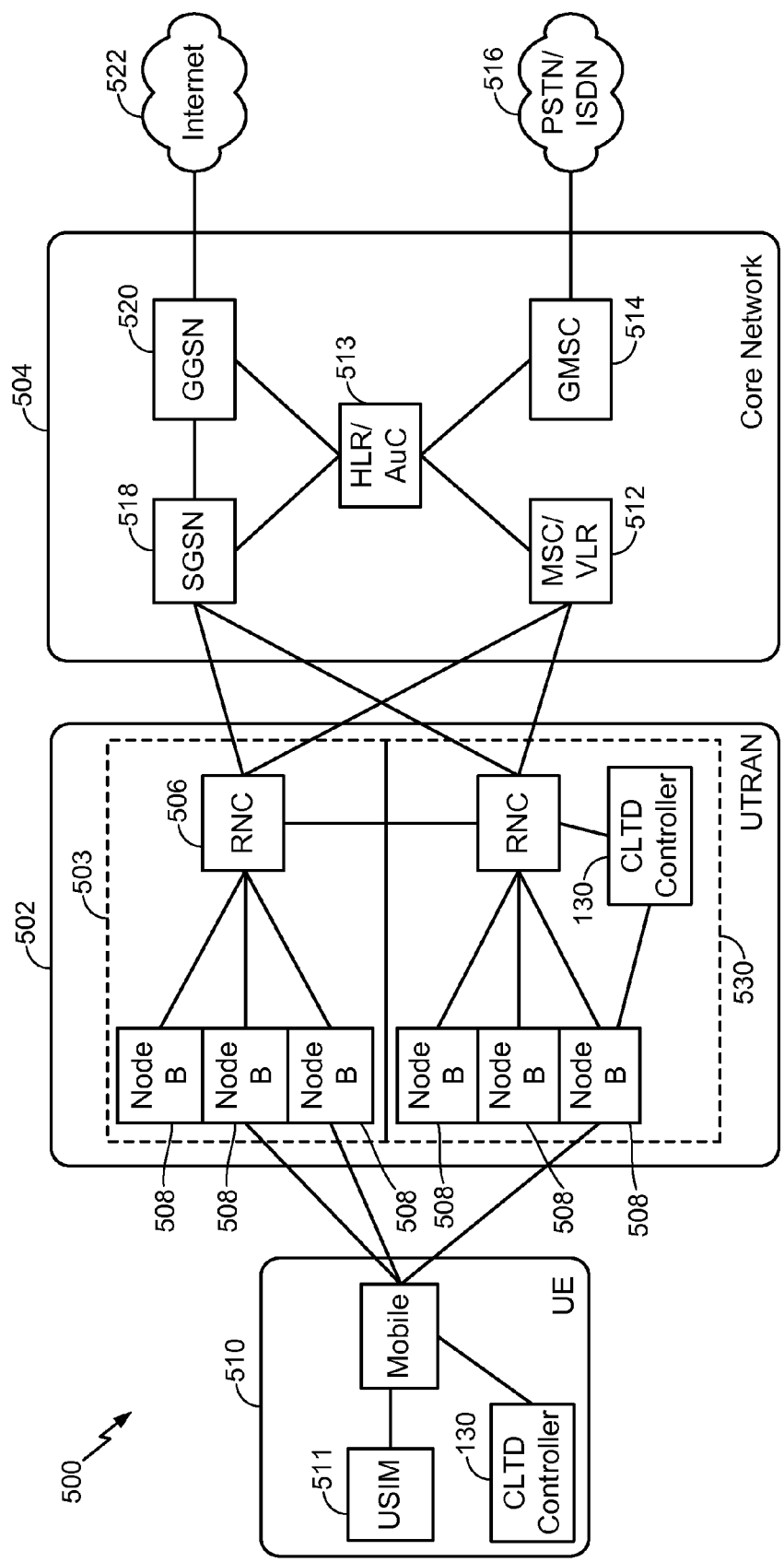
FIG. 5 is a block diagram conceptually illustrating an example of a telecommunications system.

The various concepts presented throughout this disclosure may be implemented across a broad variety of telecommunication systems, network architectures, and communication standards. By way of example and without limitation, the aspects of the present disclosure illustrated in FIG. 5 are presented with reference to a UMTS system 500 employing a W-CDMA air interface. A UMTS network includes three interacting domains: a Core Network (CN) 504, a UMTS Terrestrial Radio Access Network (UTRAN) 504, and User Equipment (UE) 510. In this example, the UTRAN 502 provides various wireless services including telephony, video, data, messaging, broadcasts, and/or other services. The UTRAN 502 may include a plurality of Radio Network Subsystems (RNSs) such as an RNS 505, each controlled by a respective Radio Network Controller (RNC) such as an RNC 506. Here, the UTRAN 502 may include any number of RNCs 506 and RNSs 505 in addition to the RNCs 506 and RNSs 3005 illustrated herein. The RNC 506 is an apparatus responsible for, among other things, assigning, reconfiguring and releasing radio resources within the RNS 505. The RNC 506 may be interconnected to other RNCs (not shown) in the UTRAN 502 through various types of interfaces such as a direct physical connection, a virtual network, or the like, using any suitable transport network.

Communication between a UE 510 and a NodeB 508 may be considered as including a physical (PHY) layer and a medium access control (MAC) layer. Further, communication between a UE 510 and an RNC 506 by way of a respective NodeB 508 may be considered as including a radio resource control (RRC) layer. In the instant specification, the PHY layer may be considered layer 1; the MAC layer may be considered layer 2; and the RRC layer may be considered layer 3. Information herein below utilizes terminology introduced in Radio Resource Control (RRC) Protocol Specification, 3GPP TS 25.331 v9.1.0, incorporated herein by reference.

The geographic region covered by the SRNS 505 may be divided into a number of cells, with a radio transceiver apparatus serving each cell. A radio transceiver apparatus is commonly referred to as a NodeB in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three NodeBs 508 are shown in each SRNS 505; however, the SRNSs 505 may include any number of wireless NodeBs. The NodeBs 508 provide wireless access points to a core network (CN) 504 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 510 may further include a universal subscriber identity module (USIM) 511, which contains a user's subscription information to a network. For illustrative purposes, one UE 510 is shown in communication with a number of the NodeBs 508. The downlink (DL), also called the forward link, refers to the communication link from a NodeB 508 to a UE 510, and the uplink (UL), also called the reverse link, refers to the communication link from a UE 510 to a NodeB 508.

The core network 504 interfaces with one or more access networks, such as the UTRAN 502. As shown, the core network 504 is a GSM core network. However, as those skilled in the art will recognize, the various concepts presented throughout this disclosure may be implemented in a RAN, or other suitable access network, to provide UEs with access to types of core networks other than GSM networks.

The core network 504 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the core network 504 supports circuit-switched services with a MSC 512 and a GMSC 514. In some applications, the GMSC 514 may be referred to as a media gateway (MGW). One or more RNCs, such as the RNC 506, may be connected to the MSC 512. The MSC 512 is an apparatus that controls call setup, call routing, and UE mobility functions. The MSC 512 also includes a visitor location register (VLR) that contains subscriber-related information for the duration that a UE is in the coverage area of the MSC 512. The GMSC 514 provides a gateway through the MSC 512 for the UE to access a circuit-switched network 516. The GMSC 514 includes a home location register (HLR) 515 containing subscriber data, such as the data reflecting the details of the services to which a particular user has subscribed. The HLR is also associated with an authentication center (AuC) that contains subscriber-specific authentication data. When a call is received for a particular UE, the GMSC 514—queries the HLR 515 to determine the UE's location and forwards the call to the particular MSC serving that location.

The core network 504 also supports packet-data services with a serving GPRS support node (SGSN) 518 and a gateway GPRS support node (GGSN) 520. GPRS, which stands for General Packet Radio Service, is designed to provide packet-data services at speeds higher than those available with standard circuit-switched data services. The GGSN 520 provides a connection for the UTRAN 502 to a packet-based network 522. The packet-based network 522 may be the Internet, a private data network, or some other suitable packet-based network. The primary function of the GGSN 520 is to provide the UEs 510 with packet-based network connectivity. Data packets may be transferred between the GGSN 520 and the UEs 510 through the SGSN 518, which performs primarily the same functions in the packet-based domain as the MSC 512 performs in the circuit-switched domain.

The UMTS air interface is a spread spectrum Direct-Sequence Code Division Multiple Access (DS-CDMA) system. The spread spectrum DS-CDMA spreads user data through multiplication by a sequence of pseudorandom bits called chips. The W-CDMA air interface for UMTS is based on such direct sequence spread spectrum technology and additionally calls for a frequency division duplexing (FDD). FDD uses a different carrier frequency for the uplink (UL) and downlink (DL) between a NodeB 508 and a UE 510. Another air interface for UMTS that utilizes DS-CDMA, and uses time division duplexing, is the TD-SCDMA air interface. Those skilled in the art will recognize that although various examples described herein may refer to a WCDMA air interface, the underlying principles are equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 510 provides feedback to the NodeB 508 over the HS-DPCCH to indicate whether it correctly decoded a packet on the downlink.

HS-DPCCH further includes feedback signaling from the UE 510 to assist the NodeB 508 in taking the right decision in terms of modulation and coding scheme and precoding weight selection, this feedback signaling including the CQI and PCI.

HSUPA utilizes as its transport channel, the enhanced dedicated channel (E-DCH). The E-DCH is implemented by three physical channels: the enhanced dedicated physical data channel (E-DPDCH), the enhanced dedicated physical control channel (E-DPCCH), and the enhanced hybrid ARQ indicator channel (E-HICH)

"HSPA Evolved" or HSPA+ is an evolution of the HSPA standard that includes MIMO and 64-QAM, enabling increased throughput and higher performance. That is, in an aspect of the disclosure, the NodeB 508 and/or the UE 510 may have multiple antennas supporting MIMO technology. The use of MIMO technology enables the NodeB 3008 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput. On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

UE 510 can incorporate the diversity controller 130 (FIG. 1) to perform the methodology 400 and other aspects as described herein. The UTRAN 502 can similarly incorporate the diversity controller 130 (FIG. 1) to perform the methodology 400 and other aspects as described herein.

Figure 6:
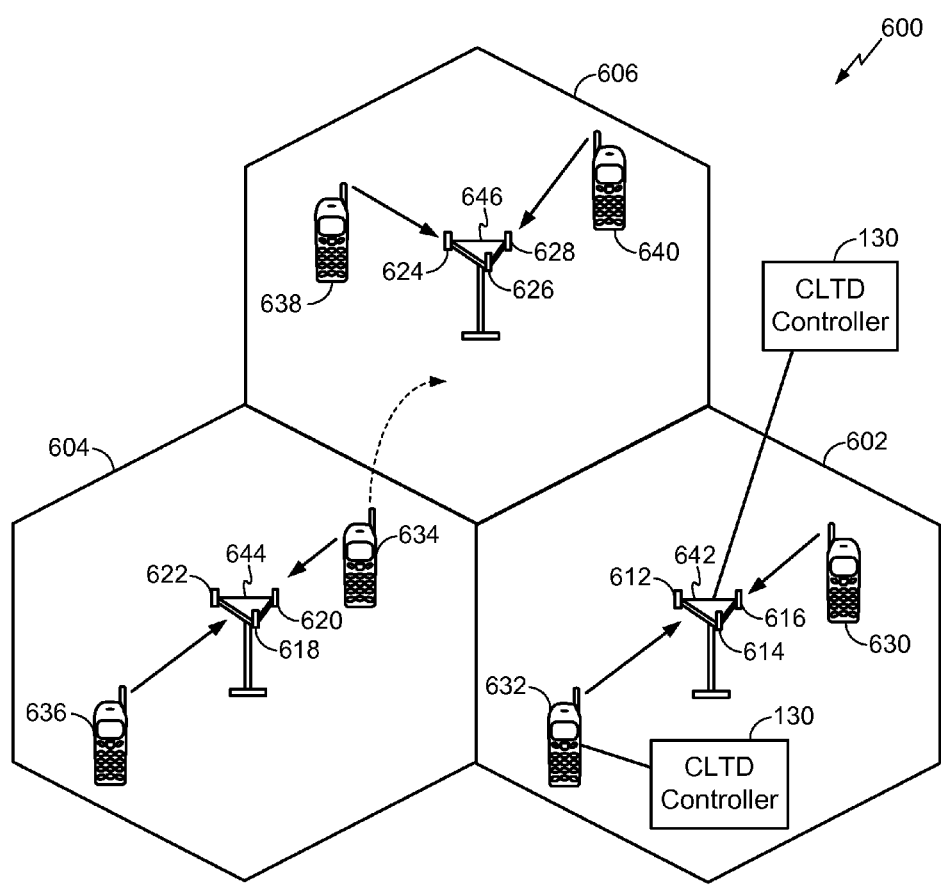
FIG. 6 is a conceptual diagram illustrating an example of a radio protocol architecture for the user and control plane.

Referring to FIG. 6, an access network 600 in a UTRAN architecture is illustrated. The multiple access wireless communication system includes multiple cellular regions (cells), including cells 602, 604, and 606 each of which may include one or more sectors. The multiple sectors can be formed by groups of antennas with each antenna responsible for communication with UEs in a portion of the cell. For example, in cell 602, antenna groups 612, 614, and 616 may each correspond to a different sector. In cell 604, antenna groups 618, 620, and 622 each correspond to a different sector. In cell 606, antenna groups 624, 626, and 628 each correspond to a different sector. The cells 602, 604 and 606 may include several wireless communication devices, e.g., User Equipment or UEs, which may be in communication with one or more sectors of each cell 602, 604 or 606. For example, UEs 630 and 632 may be in communication with NodeB 642, UEs 634 and 636 may be in communication with NodeB 644, and UEs 638 and 640 can be in communication with NodeB 646. Here, each NodeB 642, 644, 646 is configured to provide an access point to a core network for all the UEs 630, 632, 634, 636, 638, 640 in the respective cells 602, 604, and 606.

As the UE 634 moves from the illustrated location in cell 604 into cell 606, a serving cell change (SCC) or handover may occur in which communication with the UE 634 transitions from the cell 604, which may be referred to as the source cell, to cell 606, which may be referred to as the target cell. Management of the handover procedure may take place at the UE 634, at the NodeBs corresponding to the respective cells, at a radio network controller 606, or at another suitable node in the wireless network. For example, during a call with the source cell 604, or at any other time, the UE 634 may monitor various parameters of the source cell 604 as well as various parameters of neighboring cells such as cells 606 and 602. Further, depending on the quality of these parameters, the UE 634 may maintain communication with one or more of the neighboring cells. During this time, the UE 634 may maintain an Active Set, that is, a list of cells that the UE 634 is simultaneously connected to (i.e., the UTRA cells that are currently assigning a downlink dedicated physical channel DPCH or fractional downlink dedicated physical channel F-DPCH to the UE 634 may constitute the Active Set).

The modulation and multiple access scheme employed by the access network 600 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

UE 632 can incorporate the CLTD controller 130 (FIG. 1) to perform the methodology 400 and other aspects as described herein. The NodeB 642 can similarly incorporate the CLTD controller 130 (FIG. 1) to perform the methodology 400 and other aspects as described herein.

Figure 7:
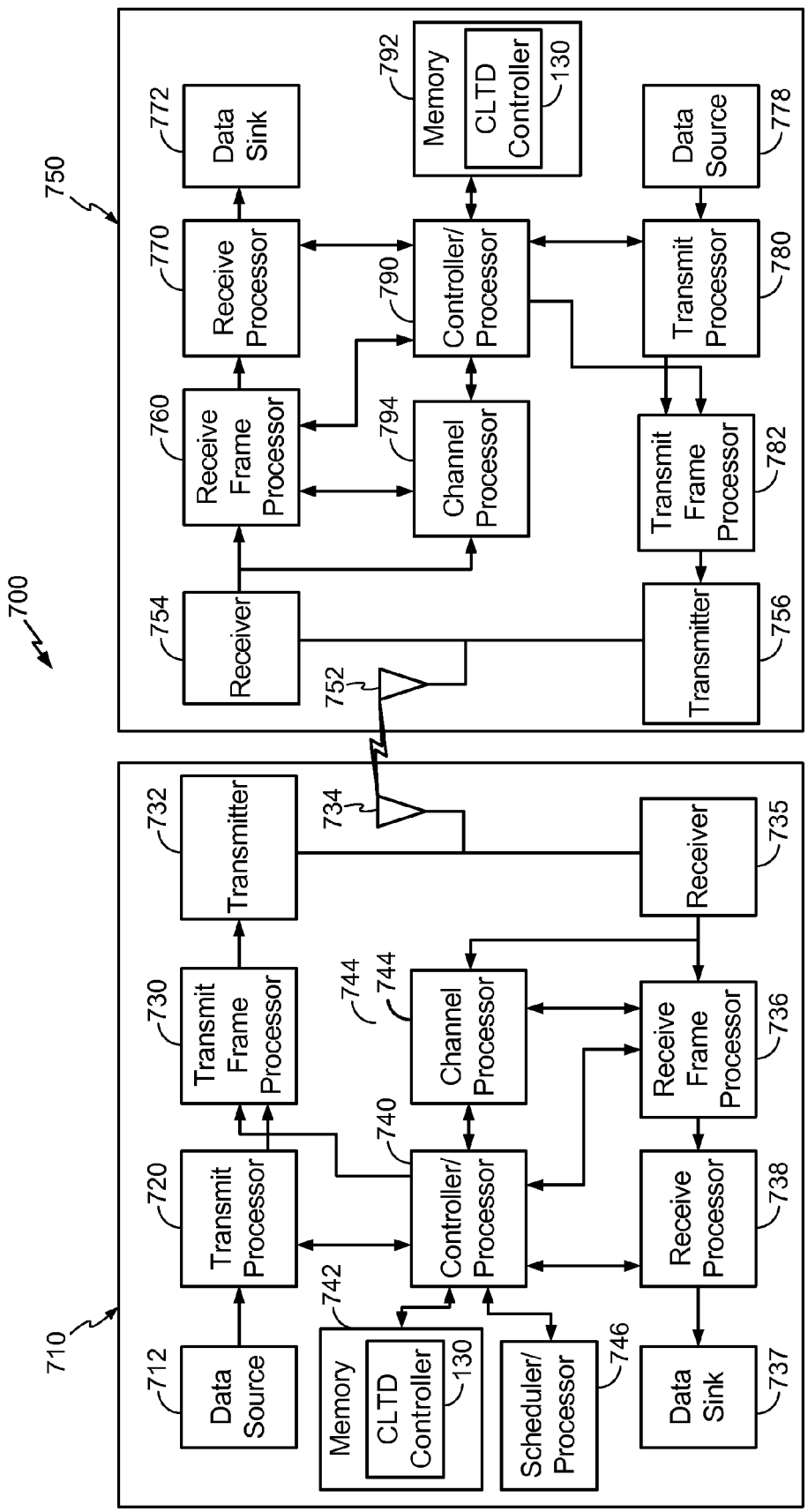
FIG. 7 is a block diagram conceptually illustrating an example of a Node B in communication with a UE in a telecommunications system.

FIG. 7 is a block diagram of a NodeB 710 in communication with a UE 750, where the NodeB 710 may be the node 106 (FIG. 1), and the UE 750 may be the UE 102 (FIG. 1). In the downlink communication, a transmit processor 720 may receive data from a data source 712 and control signals from a controller/processor 740. The transmit processor 720 provides various signal processing functions for the data and control signals, as well as reference signals (e.g., pilot signals). For example, the transmit processor 720 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 744 may be used by a controller/processor 740 to determine the coding, modulation, spreading, and/or scrambling schemes for the transmit processor 720. These channel estimates may be derived from a reference signal transmitted by the UE 750 or from feedback from the UE 750. The symbols generated by the transmit processor 720 are provided to a transmit frame processor 730 to create a frame structure. The transmit frame processor 730 creates this frame structure by multiplexing the symbols with information from the controller/processor 740, resulting in a series of frames. The frames are then provided to a transmitter 732, which provides various signal conditioning functions including amplifying, filtering, and modulating the frames onto a carrier for downlink transmission over the wireless medium through antenna 734. The antenna 734 may include one or more antennas, for example, including beam steering bidirectional adaptive antenna arrays or other similar beam technologies.

At the UE 750, a receiver 754 receives the downlink transmission through an antenna 752 and processes the transmission to recover the information modulated onto the carrier. The information recovered by the receiver 754 is provided to a receive frame processor 760, which parses each frame, and provides information from the frames to a channel processor 794 and the data, control, and reference signals to a receive processor 770. The receive processor 770 then performs the inverse of the processing performed by the transmit processor 720 in the NodeB 710. More specifically, the receive processor 770 descrambles and despreads the symbols, and then determines the most likely signal constellation points transmitted by the NodeB 710 based on the modulation scheme. These soft decisions may be based on channel estimates computed by the channel processor 794. The soft decisions are then decoded and deinterleaved to recover the data, control, and reference signals. The CRC codes are then checked to determine whether the frames were successfully decoded. The data carried by the successfully decoded frames will then be provided to a data sink 772, which represents applications running in the UE 750 and/or various user interfaces (e.g., display). Control signals carried by successfully decoded frames will be provided to a controller/processor 790. When frames are unsuccessfully decoded by the receiver processor 770, the controller/processor 790 may also use an acknowledgement (ACK) and/or negative acknowledgement (NACK) protocol to support retransmission requests for those frames.

In the uplink, data from a data source 778 and control signals from the controller/processor 790 are provided to a transmit processor 780. The data source 778 may represent applications running in the UE 750 and various user interfaces (e.g., keyboard). Similar to the functionality described in connection with the downlink transmission by the NodeB 710, the transmit processor 780 provides various signal processing functions including CRC codes, coding and interleaving to facilitate FEC, mapping to signal constellations, spreading with OVSFs, and scrambling to produce a series of symbols. Channel estimates, derived by the channel processor 794 from a reference signal transmitted by the NodeB 710 or from feedback contained in the midamble transmitted by the NodeB 710, may be used to select the appropriate coding, modulation, spreading, and/or scrambling schemes. The symbols produced by the transmit processor 780 will be provided to a transmit frame processor 782 to create a frame structure. The transmit frame processor 782 creates this frame structure by multiplexing the symbols with information from the controller/processor 790, resulting in a series of frames. The frames are then provided to a transmitter 756, which provides various signal conditioning functions including amplification, filtering, and modulating the frames onto a carrier for uplink transmission over the wireless medium through the antenna 752.

The uplink transmission is processed at the NodeB 710 in a manner similar to that described in connection with the receiver function at the UE 750. A receiver 735 receives the uplink transmission through the antenna 734 and processes the transmission to recover the information modulated onto the carrier. The information recovered by the receiver 735 is provided to a receive frame processor 736, which parses each frame, and provides information from the frames to the channel processor 744 and the data, control, and reference signals to a receive processor 738. The receive processor 738 performs the inverse of the processing performed by the transmit processor 780 in the UE 750. The data and control signals carried by the successfully decoded frames may then be provided to a data sink 735 and the controller/processor, respectively. If some of the frames were unsuccessfully decoded by the receive processor, the controller/processor 740 may also use an acknowledgement (ACK) and/or negative acknowledgement (NAK) protocol to support retransmission requests for those frames.

The controller/processors 740 and 790 may be used to direct the operation at the NodeB 710 and the UE 750, respectively. For example, the controller/processors 740 and 790 may provide various functions including timing, peripheral interfaces, voltage regulation, power management, and other control functions. The computer readable media of memories 742 and 792 may store data and software for the NodeB 710 and the UE 750, respectively. A scheduler/processor 746 at the NodeB 710 may be used to allocate resources to the UEs and schedule downlink and/or uplink transmissions for the UEs.

UE 750 can incorporate the CLTD controller 130 (FIG. 1) in memory 792 to perform the methodology 400 and other aspects as described herein. The NodeB 710 can similarly incorporate the CLTD controller 130 (FIG. 1) resident in memory 742 to perform the methodology 400 and other aspects as described herein.

Figure 8:
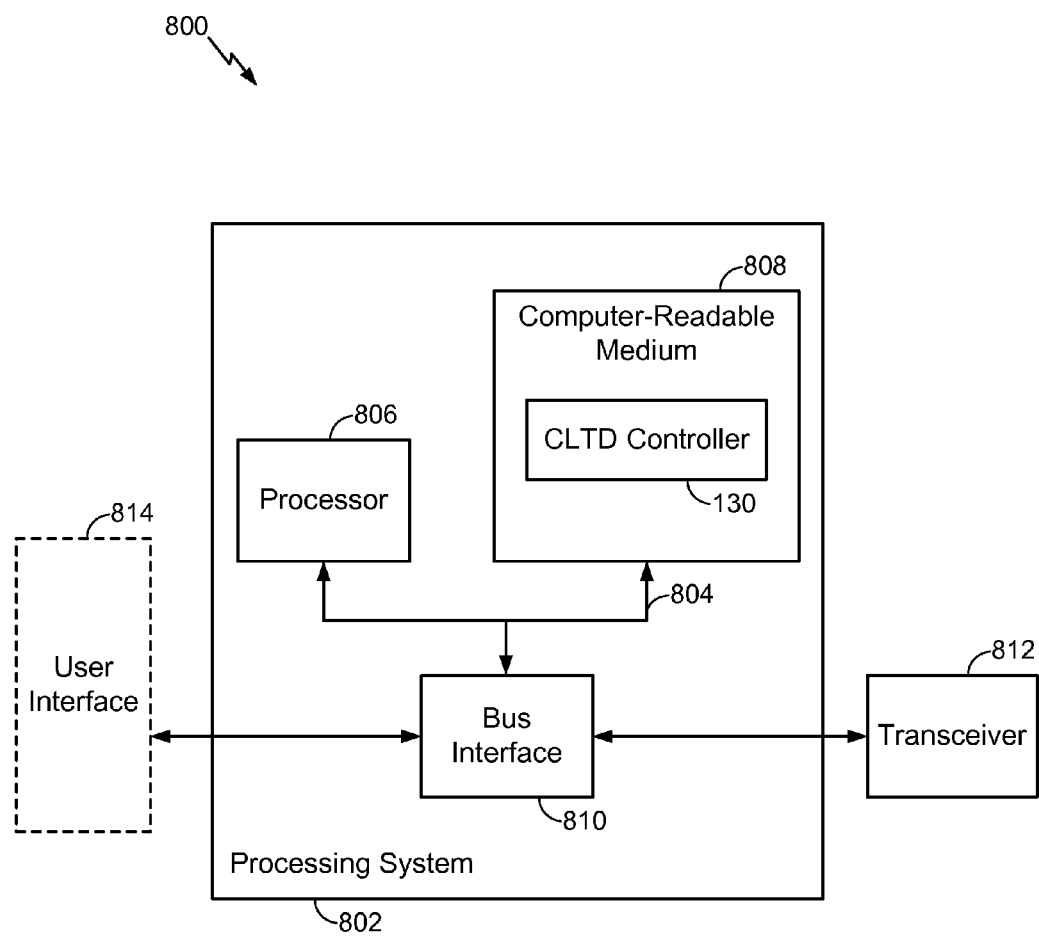
FIG. 8 is a block diagram illustrating an example of a hardware implementation for an apparatus employing a processing system.

FIG. 8 is a conceptual diagram illustrating an example of a hardware implementation for an apparatus 800 employing a processing system 802, such as for node 106 (FIG. 1) or UE 102 (FIG. 1). In this example, the processing system 8004 may be implemented with a bus architecture, represented generally by the bus 804. The bus 804 may include any number of interconnecting buses and bridges depending on the specific application of the processing system 802 and the overall design constraints. The bus 804 links together various circuits including one or more processors, represented generally by the processor 806, and computer-readable media, represented generally by the computer-readable medium 808. The bus 804 may also link various other circuits such as timing sources, peripherals, voltage regulators, and power management circuits, which are well known in the art, and therefore, will not be described any further. A bus interface 810 provides an interface between the bus 804 and a transceiver 812. The transceiver 812 provides a means for communicating with various other apparatus over a transmission medium. Depending upon the nature of the apparatus, a user interface 814 (e.g., keypad, display, speaker, microphone, joystick) may also be provided.

The processor 806 is responsible for managing the bus 804 and general processing, including the execution of software stored on the computer-readable medium 808. The software, when executed by the processor 806, causes the processing system 802 to perform the various functions described infra for any particular apparatus. The computer-readable medium 808 may also be used for storing data that is manipulated by the processor 806 when executing software.

The computer-readable medium 808 can store the CLTD controller 130 for the node 106 or the UE 102 (FIG. 1).

Figure 9:
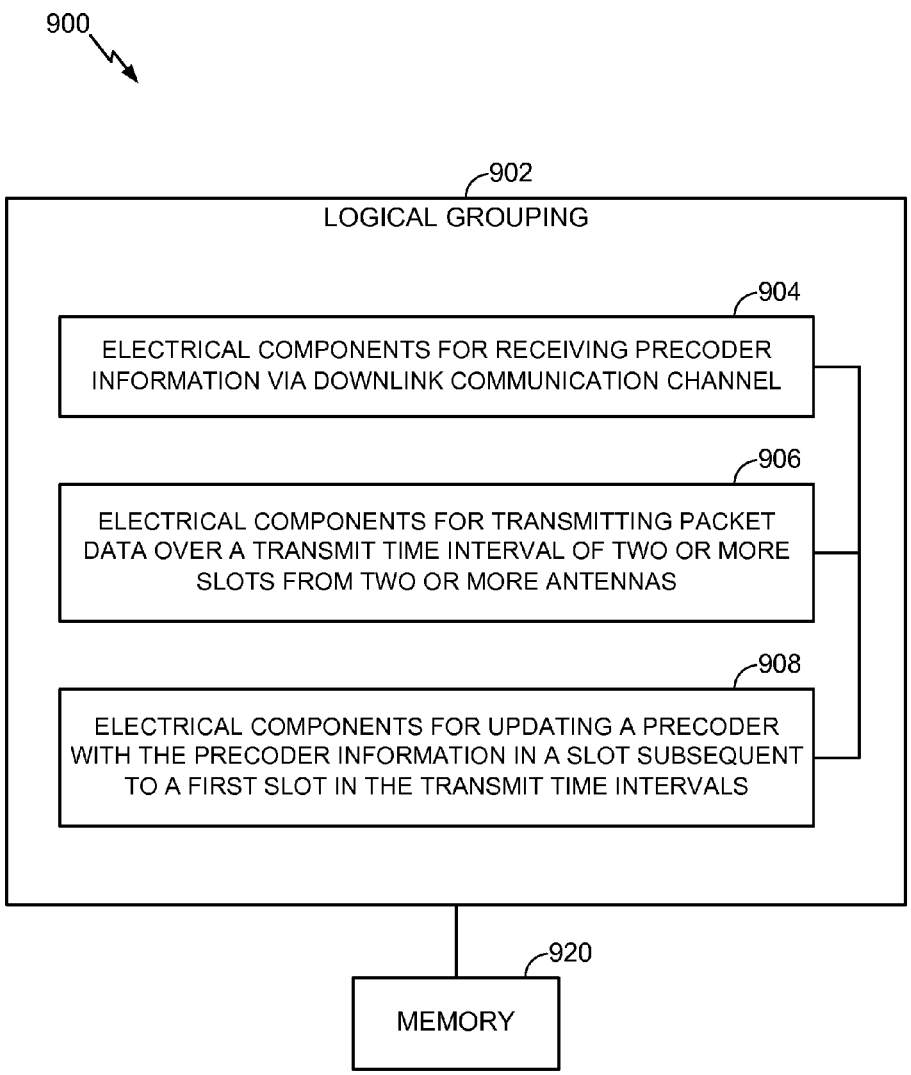
FIG. 9 illustrates an example of a system for wireless communication.

With reference to FIG. 9, illustrated is a system 900 for wireless communication. For example, system 900 can reside at least partially within user equipment that is capable of Over-The-Air (OTA) communication. Alternatively, the system 900 can be a network apparatus. It is to be appreciated that system 900 is represented as including functional blocks, which can be functional blocks that represent functions implemented by a computing platform, processor, software, or combination thereof (e.g., firmware). System 900 includes a logical grouping 902 of electrical components that can act in conjunction. For instance, logical grouping 902 can include an electrical component 904 for receiving precoder information on a downlink communication channel. Moreover, logical grouping 902 can include an electrical component 906 for transmitting packet data over a transmit time interval of two or more slots from two or more antennas. For instance, logical grouping 902 can include an electrical component 908 for updating a precoder with the precoder information in a slot subsequent to a first slot in the transmit time interval. The precoder information may be applied at a slot boundary within the TTI. Additionally, system 900 can include a memory 920 that retains instructions for executing functions associated with electrical components 904-908. While shown as being external to memory 920, it is to be understood that one or more of electrical components 904-908 can exist within memory 920.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. A method of wireless communication, comprising:
    transmitting packet data during a current transmit time interval (TTI) of two or more slots from two or more antennas using first precoder information;
    receiving second precoder information on a downlink communication channel;
    updating a precoder with the second precoder information in a slot subsequent to a first slot in the transmit time interval, wherein the second precoder information is applied at a slot boundary within the current TTI; and
    transmitting packet data during the current TTI using the second precoder information for uplink (UL) multiple-input, multiple-output (MIMO) transmission during a third slot following the slot boundary within the current TTI.

2. The method of claim 1, wherein the TTI comprises three slots.

3. The method of claim 1, wherein the precoder information is not applied at a TTI boundary.

4. The method of claim 1, wherein the packet data is transmitted using closed loop transmit diversity (CLTD).

5. The method of claim 1, wherein the precoder information is received via a downlink fractional dedicated physical channel (F-DPCH) or a fractional transmitted precoding indicator channel (F-TPICH).

6. The method of claim 2, wherein updating the precoder occurs in the second slot.

7. An apparatus for wireless communication, comprising:
    means for receiving second precoder information on a downlink communication channel;
    means for updating a precoder with the second precoder information in a slot subsequent to a first slot in a current transmit time interval (TTI) of two or more slots, wherein the second precoder information is applied at a slot boundary within the current TTI; and means for transmitting packet data during the current TTI from two or more antennas using a first precoder information and transmitting packet data during the current TTI after the slot boundary using the second precoder information for uplink (UL) multiple-input, multiple-output (MIMO) transmission during a third slot following the slot boundary within the current TTI.

8. The apparatus of claim 7, wherein the TTI comprises three slots.

9. The apparatus of claim 7, wherein the precoder information is not applied at a TTI boundary.

10. The apparatus of claim 7, wherein the means for transmitting the packet data comprises means for transmitting using closed loop transmit diversity (CLTD).

11. The apparatus of claim 7, wherein the means for receiving precoder information comprises means for receiving the precoder information via a downlink fractional dedicated physical channel (F-DPCH) or a fractional transmitted precoding indicator channel (F-TPICH).

12. The apparatus of claim 8, wherein the means for updating the precoder performs the update in the second slot.

13. The computer program product of claim 10, wherein the non-transitory computer readable medium further comprises code for receiving the precoder information via a downlink fractional dedicated physical channel (F-DPCH) or a fractional transmitted precoding indicator channel (F-TPICH).

14. A computer program product, comprising:
a non-transitory computer readable medium comprising code for:
transmitting packet data during a current transmit time interval (TTI) of two or more slots from two or more antennas;
receiving second precoder information on a downlink communication channel;
updating a precoder with the second precoder information in a slot subsequent to a first slot in the (TTI),
wherein the second precoder information is applied at a slot boundary within the current TTI; and
transmitting packet data during the current TTI using the second precoder information for uplink (UL) multiple-input, multiple-output (MIMO) transmission during a third slot following the slot boundary within the current TTI.

15. The computer program product of claim 14, wherein the TTI comprises three slots.

16. The computer program product of claim 14, wherein the precoder information is not applied at a TTI boundary.

17. The computer program product of claim 14, wherein non-transitory computer readable medium further comprises code for transmitting the packet data using closed loop transmit diversity (CLTD).

18. The computer program product of claim 15, wherein the non-transitory computer readable medium further comprises code for updating the precoder in the second slot.

19. An apparatus for wireless communication, comprising:
at least one processor; and
a memory coupled to the at least one processor,
wherein the at least one processor is configured to:
transmit packet data during a current transmit time interval (TTI) of two or more slots from two or more antennas using first precoder information;
receive second precoder information on a downlink communication channel;
update a precoder with the second precoder information in a slot subsequent to a first slot in the transmit time interval, wherein the second precoder information is applied at a slot boundary within the TTI; and
transmit packet data during the current TTI using the second precoder information for uplink (UL) multiple-input, multiple-output (MIMO) transmission during a third slot following the slot boundary within the current TTI.

20. The apparatus of claim 19, wherein the TTI comprises three slots.

21. The apparatus of claim 19, wherein the precoder information is not applied at a TTI boundary.

22. The apparatus of claim 19, wherein the packet data is transmitted using closed loop transmit diversity (CLTD).

23. The apparatus of claim 19, wherein the precoder information is received via a downlink fractional dedicated physical channel (F-DPCH) or a fractional transmitted precoding indicator channel (F-TPICH).

24. The apparatus of claim 20, wherein updating the precoder occurs in the second slot.

* * * * *